Patented Jan. 24, 1928.

1,657,443

UNITED STATES PATENT OFFICE.

JULIUS OSTERTAG, OF STUTTGART, GERMANY.

PROCESS FOR PREVENTING THE FORMATION OF INCRUSTATION OR SCALE IN BOILERS CAUSED BY SALTS OF SILICIC ACID.

No Drawing. Application filed June 17, 1927, Serial No. 199,623, and in Germany November 26, 1925.

Means for removing the silicic acid present in the water used in boilers have hitherto been sought for in vain; all the experiments made in this direction having proved unsuccessful. Suggestions have frequently been made, but the practical application of these suggestions did not give any successful result.

It has frequently been proposed to render the silicic acid in a steam boiler harmless by adding sufficient soda to the feed water to keep the water in the boiler always alkaline. It was thought that by so doing the silicic acid would be converted into sodium silicate which remains in colloidal solution and only commences to separate out at a very high degree of concentration.

It has been shown however by numerous experiments that the concentration of silicic acid or of sodium silicate respectively in the boiler only needs to be very slight in order to cause the formation of scale. This deviation from the generally applied theory has been observed in many cases which have been thoroughly investigated and as a result of these observations a solution of this important question was arrived at.

The present invention renders it possible to prevent the hitherto unavoidable deposit of incrustation or scale in boilers, which is formed owing to the presence of salts of silicic acid. The process employed for this purpose is so extremely simple that its application does not give rise to any difficulties whatever, inasmuch as it consists simply in maintaining a definite concentration of the boiler water as regards its easily soluble salt content together with a corresponding degree of alkalinity of the boiler water by drawing-off boiler water and discharging it outside.

The following example will serve to explain the process.

Assuming the analysis of the untreated feed water to be as follows:

|   | Mg. per litre. |
|---|---|
| CaO | 300 |
| MgO | 71.4 |
| $CO_2$ in the form of bi-carbonate | 78.5 |
| $SO_3$ | 286 |
| Cl | 125 |
| $SiO_2$ | 10.7 | then it can be calculated from these figures, since one degree of hardness, German scale, equals .70 degree of hardness, U. S. scale, the U. S. degree denoting ten parts per million, that there will be:

A total hardness of 41° or 586 parts per million.

A carbonate hardness of 10° or 143 parts per million.

A non-carbonate hardness of 31° or 443 parts per million.

A chalk hardness of 30° or 429 parts per million.

A magnesia hardness of 10° or 143 parts per million.

If this water is purified by the addition of soda, which term is used in this description to denote the carbonate, for the purpose of precipitating the non-carbonate hardness, then each meter of the purified water will contain 506 grammes of $Na_2SO_4$, 207 grammes of NaCl and 21.8 grammes of $Na_2SiO_3$.

In consequence of the continuous evaporation this concentration of salts will increase more and more, so that on this account alone blowing-off from the boiler becomes necessary in order to prevent an excessive concentration of Glauber's salt and common salt.

At the present time it is customary, when using a sludge return process to keep the degree of alkalinity of the water in the boiler equivalent to between 5–10 ccm. of $\frac{1}{10}$ normal HCl for 50 ccm. of the water, i. e. so that 1 cubic metre of the water in the boiler contains 530 to a maximum of 1060 grammes of excess of soda calculated as $Na_2CO_3$, for the purpose of compensating for irregularities in the hardness of the water, in the measuring operations, in the evaporation, in the composition of the soda and so forth, and also especially for the purpose of providing protection against the material of the boiler being attacked. If now the water in the boiler is titrated in the usual way with methyl orange and decinormal hydrochloric acid, large errors may arise inasmuch as the $Na_2SiO_3$ contained in the said water will be estimated as $Na_2CO_3$. The test will therefore lead one to believe that the water contains the prescribed amount of alkalinity due to soda, whereas in reality, there may be only sodium silicate present. So long as soda is still present, those constituents capable of causing hardness, which still enter the boiler in the purified water, are precipitated in the form of a harmless sludge, which can be easily cleared out by the sludge return arrangements. Sulphate of calcium in particular is completely converted into calcium carbonate in the presence of an excess of soda in the water in the boiler, whereas when there is a deficiency of soda, the calcium sulphate at once settles on the walls of the boiler and forms an incrustation. If now there is no alkalinity due to soda in the water in the boiler, but on the other hand silicate of soda is present, which has been estimated in error as soda, and if constituents capable of causing hardness enter the boiler with the purified water, then these latter will react with the sodium silicate in similar manner to their manner of reacting with soda. The substances produced by this reaction, such as magnesium silicate and calcium silicate, do not, however, form a harmless sludge, but at once settle, exactly as calcium sulphate does when there is a deficiency of soda, on the walls of the boiler where they form an extremely highly insulating layer.

The problem which it is the object of the present invention to solve is as follows:—

It is intended that a true alkalinity due to soda shall be obtained in the boiler water, so that titration can be carried out in the ordinary way. In carrying this into effect it is intended that the error caused by the sodium silicate which is present shall be so small that it is no longer of importance, i. e. with a degree of alkalinity of the boiler water equivalent to 5–10 ccm. of $\frac{1}{10}$ normal HCl for 50 ccm. of water titrated with methyl orange, not more than 2 ccm. of the acid used shall go to neutralize $Na_2SiO_3$ whilst the remainder neutralizes the $Na_2CO_3$.

Bearing in mind the analysis already given the following calculations are arrived at:

1 ccm. of decinormal hydrochloric acid is equivalent to .0053 of a gramme of soda or, if 50 ccm. of water (i. e. the twenty-thousandth part of 1 cubic metre) are used for the test, 1 ccm. of decinormal acid corresponds to an excess of soda of 106 grammes per cubic metre, or, since 1 ccm. of decinormal acid is equivalent to .0061 of a gramme of $Na_2SiO_3$, it corresponds to 122 grammes of $Na_2SiO_3$ per cubic metre.

If, now, the degree of alkalinity of the water in the boiler is equal on an average to 7.5 ccm. of decinormal HCl and if 2 ccm. are taken up by $Na_2SiO_3$ and 5.5 ccm. by $Na_2CO_3$, then 1 cubic metre of the water in the boiler contains $5.5 \times 106 = 583$ grammes of $Na_2CO_3$ and 244 grammes of $Na_2SiO_3$. Now, according to the analysis given above, the untreated feed water contains 10.7 mg. of $SiO_2$ per litre.

Therefore the purified water will contain 21.8 mg. of $Na_2SiO_3$ per litre. If the maximum $Na_2SiO_3$ content of the boiler water is not to exceed 244 grammes, then the boiler water must not be concentrated to more than $$\frac{244}{21.8} = 11.2$$

times its original concentration.

Any desired degree of concentration can be easily estimated if any other salts present in considerable quantity are taken into consideration.

From the preceding calculations it will be seen, that the purified water contains 506 grammes of $Na_2SO_4$ and 207 grammes of NaCl per cubic meter of water. If these salts are concentrated up to 11.2 times their original concentration, then 1 cubic metre of the water in the boiler will contain $506 \times 11.2 =$ approximately 5670 grammes of $Na_2SO_4$ and $207 \times 11.2 =$ approximately 2325 grammes of NaCl. If the concentration of the solution in the boiler is measured in Baumé degrees, then with an 11.2 fold concentration the Glauber's salt will give a figure of $$\frac{5670}{8800} = \text{approximately } .644° \text{ Bé}.$$

and the common salt on the other hand will give a figure of $$\frac{2325}{10000} = .2325° \text{ Bé}.$$

The excess of soda present in the water amounting to 583 grammes per cubic metre gives a concentration of $$\frac{583}{7000} = .0833° \text{ Bé}.$$

and the $Na_2SiO_3$ contained in the water corresponds to a concentration of $$\frac{244}{4545} = .0537° \text{ Bé.},$$

so that a total concentration of 1.0135° Bé. is obtained with an 11.2 fold evaporation of the boiler contents. This concentration of 1.0135° Bé. together with a degree of alkalinity corresponding to 7.5 ccm. of $\frac{1}{10}$ normal HCl for 50 ccm. of boiler water, as titrated with methyl orange, would have to be continuously maintained. This is possible, if $$\frac{100-}{11.2} = 8.94\%$$

of the quantity of feed water is continuously drawn off from the boilers. In carrying this out it is not necessary to measure specially the amount of boiler water blown-off, inasmuch as an indication as to whether the right quantity has actually been withdrawn is always given by the measurement of the concentration of the boiler water, so long as the prescribed degree of alkalinity is always approximately maintained.

The blowing-off of the boiler water is effected in such a manner that the heat is as far as possible recovered again. This can be attained by the provision of a thin pipe connected to a suitable point on the boiler and serving for conveying a certain quantity of the boiler water to an evaporator. In this evaporator the boiler water is placed under atmospheric pressure by means of a pipe. In consequence of this decrease of pressure the temperature is lowered so that heat is set free which causes a part of the boiler water conveyed to the evaporator to evaporate. The steam generated in this way is withdrawn from the evaporator and conveyed into a water purifier or a feed water container, in which the steam condenses. The quantity of steam formed in the container is dependent upon the original pressure, that is to say, on the original temperature, of the boiler water.

For example, at an absolute pressure of 16 atmospheres about 20% of the blown-off boiler water containing the salts is evaporated. The remaining water, the temperature of which has decreased to about 100° C., in consequence of the decrease of pressure, is led from the evaporator into a pre-heater in which it yields up the excess of its heat to the fresh feed water which is led in a counter current through the pre-heater.

In this way about 90% of the heat present in the drawn-off boiler water is recovered, and about 20% (according to the boiler pressure) of the drawn-off boiler water is also recovered as condensate.

Having now particularly described the nature of said invention and in what manner the same is to be performed, I declare that what I claim is:—

A process for preventing the formation of incrustation or scale in boilers using water containing an alkaline earth compound and salts of silicic acid, comprising blowing off the boiler and adding make-up water treated to provide an excess of sodium carbonate over sodium silicate in the water in the boiler, the amount of blow-off, and the degree of alkalinity in and the amount of the make-up water being calculated to maintain the total concentration below a predetermined maximum.

Dated the 17th day of May, 1927.

In testimony whereof I have signed my name to this specification.

JULIUS OSTERTAG.